United States Patent
Colibert

[11] 3,864,675
[45] Feb. 4, 1975

[54] MOTION RESPONSIVE SWITCH AND ALARM SYSTEM

[76] Inventor: Floyd A. Colibert, P.O. Box 11395, Salt Lake City, Utah 84111

[22] Filed: June 13, 1973

[21] Appl. No.: 369,490

[52] U.S. Cl................. 340/224, 200/61.53, 340/65, 340/261, 340/262
[51] Int. Cl......................... G08b 13/02, B60r 25/10
[58] Field of Search ............ 340/65, 283, 261, 262, 340/224; 200/61.53, 61.93, 61.45

[56] References Cited
UNITED STATES PATENTS
| | | | |
|---|---|---|---|
| 3,192,517 | 6/1965 | Werlin | 340/276 |
| 3,562,706 | 2/1971 | Mason | 340/65 |

Primary Examiner—David L. Thafton
Attorney, Agent, or Firm—Criddle & Thorpe

[57] ABSTRACT

An alarm system is provided including a motion responsive switch and a transmitter connected to the switch and energizable thereby when the switch is subjected to appropriate movement whereby signals are transmitted to a remote receiver and alarm. The motion responsive switch and transmitter are mounted in a common enclosure to provide a compact detector package with a support cord or the like fastened to the top of the enclosure for conveniently hanging the package from a vehicle brake handle or other anchor, such that the enclosure hangs substantially vertical regardless of the vehicle's inclination, thereby preventing erroneous operation of the switch.

7 Claims, 4 Drawing Figures

PATENTED FEB 4 1975  3,864,675

MOTION RESPONSIVE SWITCH AND ALARM SYSTEM

The present invention is generally related to alarm systems and, more particularly, to an improved vehicle alarm system which is insensitive to the associated vehicle's angle of inclination or orientation.

In the past, various alarm systems have been proposed or manufactured for providing alarm signals in response to vibrations or other disturbances of a vehicle by a would-be thief or vandal. Such conventional alarms, for the most part, have been either too expensive to manufacture and install or have proven unreliable in operation. Several conventional systems utilized some type of level responsive switch which was closed upon appropriate vibration or movement of the vehicle. The switches were rigidly mounted to the vehicle structure, such that they were ineffective or provided erroneous signals if the vehicle was not parked on a level. Other switch arrangements have been proposed in attempts to compensate for vehicle orientation. However, such switch arrangements, for the most part, have been relatively complex in structure and too expensive for most vehicle owners to purchase and install.

It is an object of the present invention to provide an improved vehicle alarm system which overcomes the above-mentioned problems of conventional vehicle alarm systems.

Another object of the present invention is to provide a novel vehicle alarm system including a compact detector package which is adapted to be hung from a component of the vehicle's structure to assume a substantially vertical orientation regardless of the vehicle's angle of inclination.

It is a further object of the present invention, to provide a unique vehicle alarm system including a compact detector package with a transmitter and motion responsive switch mounted in a common enclosure which is freely suspended from an anchor point associated with the vehicle's structure to provide switch response which is independent of the vehicle's angle of inclination.

Still another object of the present invention is to provide a versatile motion responsive switch with means for conveniently adjusting the sensitivity to provide the desired response characteristics for a wide variety of applications.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
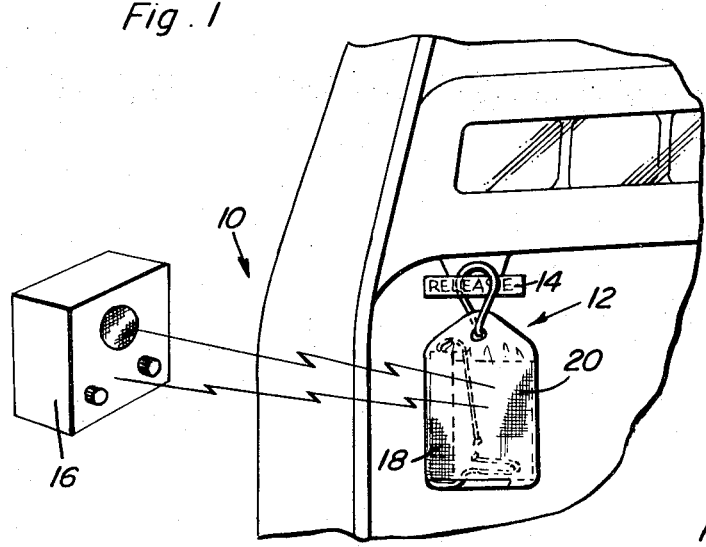
FIG. 1 is an elevational view of the detector package associated with the present invention mounted to a vehicle brake release handle with a diagrammatic illustration of a typical remote receiver and alarm.

Referring now, more particularly, to FIG. 1 of the drawings, the alarm system of the present invention is generally indicated by the numeral 10 and includes a detector package 12 suspened from a brake release handle 14, such as that normally associated with a motor vehicle, to provide signals to a remote receive and alarm unit 16 under predetermined conditions. Detector package 12 includes a motion responsive switch 18 and a compact transmitter 20 connected to the switch to transmit signals to remote unit 16 when the switch is actuated. Preferably, transmitter 20 and remote unit 16 are of a well known type such as that disclosed by U.S. Pat. No. 3,688,675. Of course, the remote unit may be provided with various types of indicators, such as lights or buzzers, in lieu of or in conjunction with the audio type alarm.

Figure 2:
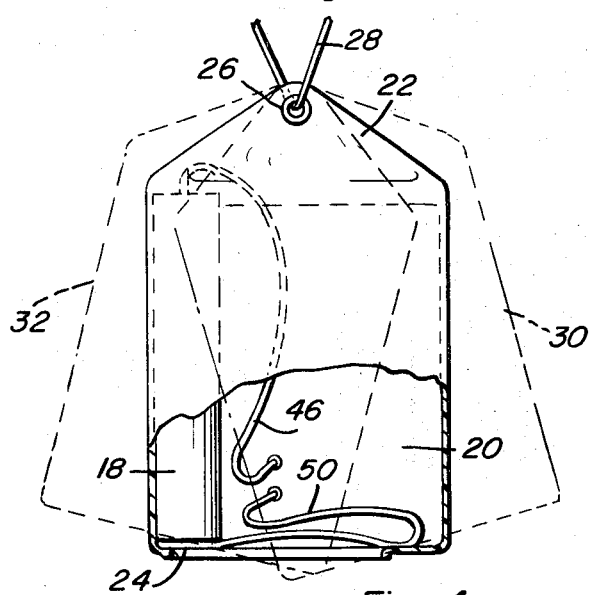
FIG. 2 is an elevational view of the detector package with sections removed to show the motion responsive switch and transmitter.

As mentioned above, one of the problems encountered with many conventional vehicle alarm systems was that erroneous signals, or no signals at all, were provided when the vehicle was parked on an incline, such as in an uphill or downhill situation. With the detector package of the present invention, this problem is overcome as the motion responsive switch 18 is maintained in a substantially vertical position regardless of the angle of inclination or orientation of the vehicle. This is best illustrated in FIG. 2. It will be appreciated that both motion responsive switch 18 and transmitter 20 are mounted in a common enclosure 22, preferably, of flexible material, such as Naugahyde. The enclosure is provided with a bottom opening 24 of sufficient shape and dimension to permit the insertion of transmitter 20 and motion responsive switch 18 into the enclosure where they are maintained in snug abutting engagement with each other. The upper end portion of enclosure 22 is provided with an eyelet 26, or other appropriate means, which receives a support cord 28, or other means, which may be conveniently fastened to an anchor point on the vehicle, such as the brake release handle 14 illustrated in FIG.1. The weight of transmitter 20 and motion responsive switch 18 are appropriately distributed such that the motion responsive switch assumes a substantially vertical orientation when the enclosure is freely suspended from cord 28. When the detector package is mounted in place, it will hang freely from the support cord regardless of the angle of inclination of the vehicle. Free movement of the package to a vertical position is diagrammatically illustrated by the phantom view set 30 and 32 in FIG. 2.

Figure 4:
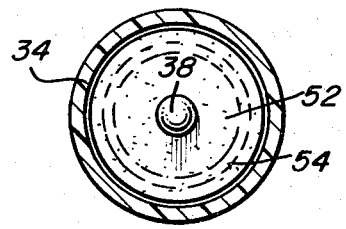
FIG. 4 is a sectional view taken along section 4—4 of FIG. 3.
Figure 3:
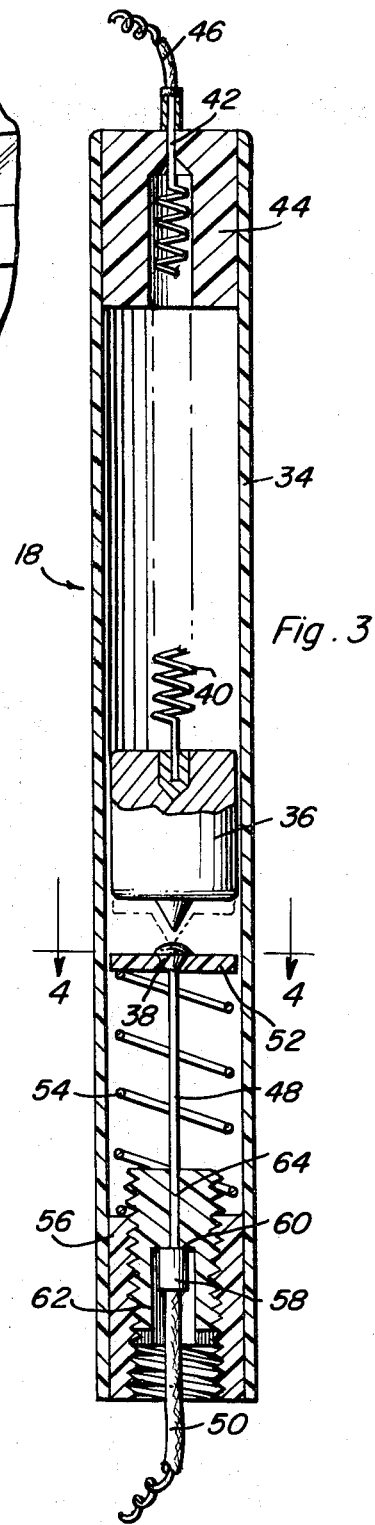
FIG. 3 is a longitudinal sectional view of the motion responsive switch associated with the present invention.

Referring now, more particularly, to FIGS. 3 and 4, the structure of the motion responsive switch may be seen in more detail. The switch includes an elongated tubular housing 34, preferably of insulation material, with a movable contact 36 and a stationary contact 38 mounted therein. Movable contact 36 is suspended in housing 34 by way of an elongated coil tension spring 40, or other elastic member, with an upper end portion 42 affixed to housing 34 by way of an insulation body 44. Spring 40 is of conductive material with the upper end thereof being connected to an electrical lead 46, which is connected to transmitter 20. Stationary contact 38 is provided with an elongated neck portion 48 which extends downwardly to the lower end portion of housing 34 where it is connected to a second electrical lead 50, which, in turn, is appropriately connected to transmitter 20. Normally, movable contact 36 is spaced from stationary contact 38 by an appropriate distance, such as 1/100 inch. When the motion responsive switch is subjected to vibrations, or other movements, which impart vertical forces to movable contact 36, it will be forced downwardly a sufficient distance to engage stationary contact 38. This completes a circuit with transmitter 20, which, in turn, sends signals to the receiver and alarm 16. Of course, the types of conditions to which movable contact 36 responds depends upon: (1) the physical characteristics of support spring 40, (2) the direction and magnitude of the forces acting upon the switch, and (3) the spacing between the stationary and movable contacts.

It will be appreciated that the response or sensitivity of the switch may be adjusted by adjusting the position of stationary contact 38 within housing 34. A disc-like movable spring seat member 52 is attached to contact 38 at the upper end thereof. A coil compression spring 54 is disposed within housing 34 and presses upwardly against movable seat member 52. The lower end of spring 54 presses downwardly against a stationary spring seat member 56, which is bonded or otherwise affixed to the lower end portion of housing 34. The lower end of stationary contact neck portion 48 is provided with a stop member 58 which is affixed to the neck portion and normally is in biasing engagement with a stop shoulder 60 associated with an adjustment member 62. Preferably, adjustment member 62 is made of insulation materials and is in threaded engagement with stationary spring seat member 56. A bore 64 extends axially from the upper end of adjustment member 62 to stop shoulder 60, with stationary contact neck portion 48 being reciprocally received therein. It will be appreciated that when the vertical position of adjustment member 64 is selectively adjusted, the vertical position of stationary contact 38 is likewise adjusted. This adjusts the sensitivity of the switch.

From the foregoing description, it will be appreciated that the motion responsive switch of the present invention provides a relatively simple, yet highly versatile means of actuating a transmitter circuit in response to predetermined motion conditions. The switch is provided with a means of expeditiously adjusting the sensitivity thereof to provide the desired response characteristics best suited for the particular application. It will also be appreciated that the detector package associated with the alarm system of the present invention provides a compact, self-contained structure which does not require permanent installation, as necessary with conventional alarm systems. The detector package is merely attached to an appropriate vehicle component, such as a break release handle, permitting the package to be suspended freely, whereby it assumes a substantially vertical orientation, regardless of the vehicle's angle of inclination. This assures proper switching and prevents the transmission of erroneous signals to the receiver-alarm unit. It should also be noted that the detector package may be utilized with various types of vehicles and conveniently transferred from one vehicle to the other, as desired. This was not possible with conventional vehicle alarm systems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A self-contained detector for an alarm system to provide signals to a remote receiver, said detector comprising
   an enclosure;
   mounting means attached to said enclosure whereby said enclosure is adapted to be freely suspended beneath said mounting means;
   motion responsive switch means having
      an elongate housing in said enclosure, said housing being arranged to be substantially vertical when the enclosure is suspended by the mounting means,
      an upper electrical contact member extending into the housing at the top thereof when said enclosure is suspended beneath the mounting means,
      a lower electrical contact member extending into the housing at the bottom thereof when the enclosure is suspended from the mounting means,
      an electrical conductive movable contact member, and means resiliently mounting the movable contact member in the housing and electrically connected to the upper contact member whereby the entire movable contact is closely spaced above the lower contact member when the means resiliently mounting the movable contact is stretched by the weight of the movable contact member; and
   transmitter means mounted in said enclosure to provide signals to the remote receiver in response to actuation of said motion responsive switch means.

2. A self-contained detector as in claim 1, wherein the lower contact member has an upper central extremity and the movable contact member has a lower central extremity in vertical alignment with the upper central extremity when the elongated housing is vertically arranged and the movable contact member is centrally positioned within the elongate housing.

3. For use with an alarm system, a motion responsive switch, said switch comprising
   an elongate housing having upper and lower end portions;
   a stationary contact disposed in said housing;
   a movable contact disposed in said housing above said stationary contact and normally spaced therefrom;
   elongate elastic support means having upper and lower ends and fastened at the upper end thereof to said upper end portion of said elongate housing, said movable contact being attached to said lower end of said elastic support means for vertical movement in said housing; and
   adjustable mounting means supporting said stationary contact in said lower end portion of said housing and selectively adjustable to adjust said stationary contact relative to said movable contact to provide the desired spacing therebetween, said adjustable mounting including
      a stationary spring seat member affixed to said lower end portion of said housing,
      a selectively movable spring seat member in engagement with said stationary contact,
      spring means between said stationary and movable spring seat members biasing said stationary contact in a first direction toward said movable contact, and stop means associated with said stationary contact for preventing movement thereof beyond a selected position under the influence of said spring means.

4. The structure set forth in claim 3 wherein said stop means includes a stop member attached to said stationary contact, said adjustable mounting means including an adjustment member adjustably fastened to said stationary spring seat member for selective vertical movement relative thereto.

5. The structure set forth in claim 4 wherein said adjustment member includes a stop shoulder engaged by said stop member associated with said stationary contact.

6. The structure set forth in claim 5 wherein said stop member normally presses upwardly against said stop shoulder under the influence of said spring means.

7. The structure set forth in claim 6 wherein said stationary contact includes a downwardly extending neck portion which is reciprocally received by a bore in said adjustment member, said stop member being attached to the lower end of said neck portion below said bore.

* * * * *